United States Patent [19]
Giallorenzi et al.

[11] Patent Number: 5,583,853
[45] Date of Patent: *Dec. 10, 1996

[54] SYNCHRONOUS CDMA TRANSMITTER/RECEIVER

[75] Inventors: Thomas R. Giallorenzi, Salt Lake City; Mark T. Rafter, Park City; Kenneth C. Greenwood; Harry B. Press, both of Sandy; Samuel C. Kingston, Salt Lake City, all of Utah

[73] Assignee: Unisys Corporation, Blue Bell, Pa.

[*] Notice: The term of this patent shall not extend beyond the expiration date of Pat. No. 5,499,236.

[21] Appl. No.: 563,876

[22] Filed: Nov. 28, 1995

Related U.S. Application Data

[62] Division of Ser. No. 291,648, Aug. 16, 1994, Pat. No. 5,499,236.

[51] Int. Cl.$^6$ .............................. H04J 13/02; H04L 7/00
[52] U.S. Cl. ......................... 370/441; 370/503; 375/356
[58] Field of Search ........................... 370/18, 50, 100.1, 370/103, 105, 108; 375/200, 205–210, 356; 380/48; 359/115, 136, 158, 159

[56] References Cited

U.S. PATENT DOCUMENTS

| | | | |
|---|---|---|---|
| 4,908,836 | 3/1990 | Rushforth et al. | 370/18 X |
| 5,031,173 | 7/1991 | Short et al. | 370/18 |
| 5,056,106 | 10/1991 | Wang et al. | 375/200 |
| 5,235,615 | 8/1993 | Omura | 375/205 |
| 5,343,496 | 8/1994 | Honig et al. | 370/18 X |
| 5,499,236 | 3/1996 | Giallorenzi et al. | 370/18 |

*Primary Examiner*—Melvin Marcelo
*Attorney, Agent, or Firm*—Charles J. Fassbender; Mark T. Starr; Steven R. Petersen

[57] ABSTRACT

A multipoint-to-point CDMA communication system comprises a plurality of CDMA transmitting stations and a single CDMA receiving station, all of which are intercoupled to each other over one CDMA channel and one feedback channel. On the one CDMA channel, the plurality of CDMA transmitting stations simultaneously send respective CDMA signals to the receiving station. In the receiving station, respective time differences are measured between a reference clock signal and the spreading codes in the CDMA signals from each of the CDMA transmitting stations; and these time differences are indicated in respective error signals which the CDMA receiving station sends on the feedback channel to each of the CDMA transmitting stations. Each CDMA station responds to its error signals by time shifting its spreading code such that it arrives in the receiving station in synchronization with the reference clock signal. This synchronization enables interference between the spreading codes at the receiving station to be reduced by using codes which have minimal cross-correlation when their time difference is zero; and consequently, the maximum number of stations that can simultaneously transmit is increased.

6 Claims, 5 Drawing Sheets

S1) $TS_x \Rightarrow$ use $PN_0$ to XMT $A_x$ in $CDMA_x$ on $FB_1$

S2) $RMOD_y \Rightarrow$ sweeps phase of its $PN_0$ until locked to rcv'd $PN_0$
    S3) after lock, read $A_x$ from $CDMA_x$
    S4) send $A_x$ to arbiter
    S5) proceed if "go" from arbiter
    S6) determine timing error of rcv'd $PN_0$
    S7) XMT timing error to $TS_x$ via message M on $FB_2$ S8) $TS_x \Rightarrow$ receive timing error in message M on $FB_2$
    S9) time shift phase of $PN_0$ in $TS_x$ S10) $RMOD_y \Rightarrow$ time shifts its $PN_0$ to maintain lock
    S11) after shift, determine timing error $ER_x$
    S12) if timing error to ref clk exceeds 1/4 chip
        then XMT timing error per S7)
    S13) if timing error to ref clk less then 1/4 chip
        then obtain $PN_x$ from arbiter, and XMT $PN_x$ to $TS_x$ via message M on $FB_2$ S14) $TS_x \Rightarrow$ receive $PN_x$ in message M on $FB_2$
    S15) switch transmissions from $PN_0$ to $PN_x$
        keep timing of $PN_x$ = timing of $PN_0$ S16) $RMOD_y \Rightarrow$ starts receiving $CDMA_x$ data using $PN_x$
    keep timing of $PN_x$ = ref clk
    S17) determine timing error of rcv'd $PN_x$ to RCK
    S18) XMT timing error to $TS_x$ via message M on $FB_2$

FIG.5

Eq. 1 → $N_S = \dfrac{W}{R_b}$

Eq. 2 → $\begin{cases} W = 24 \times 10^6 \text{ CHIPS/SEC} \\ R_b = 93.8 \times 10^3 \text{ CHIPS/SEC} \end{cases}$ Eq. 3 → $N_S = 256$ Eq. 4 → $N_A \approx \dfrac{\frac{W}{R_b}}{\frac{E_b}{N_o}}$ Eq. 5 → $\dfrac{E_b}{N_o} \approx 10$ Eq. 6 → $N_A \approx 25$

SYNCHRONOUS CDMA TRANSMITTER/RECEIVER

This is a divisional of U.S. patent application Ser. No. 08/291,648 filed on Aug. 16, 1994, now U.S. Pat. No. 5,499,236.

BACKGROUND OF THE INVENTION

This invention relates to communication systems; and more particularly, it relates to multipoint-to-point CDMA communication systems.

As used herein, the term "multipoint-to-point" refers to a communication system in which several transmitting stations which are located at various points send data to a single receiving station which is located at another point. One way to operate such a system is to have each transmitting station send its data as an amplitude modulated, frequency modulated, or phase modulated signal in its own wireless channel which differs in frequency for each station. However, if the total number of transmitting stations in the communication system is large, then a correspondingly large number separate frequency bands is required.

Alternatively, each of the transmitting stations in the multipoint-to-point communication system can send its data over a separate cable. However, when the transmitting stations are remotely located from the receive station, too much connecting cable is required.

By comparison, with a multipoint-to-point CDMA communication system, all of the transmitting stations send their data in either a single wireless channel or a single cable. By the term "CDMA" is herein meant "code division multiple access". In a CDMA system, each transmitting station modulates the data that it sends by a respective spreading code which is unique to that station. That modulated data from all of the stations is sent on the single wireless channel/cable in one frequency band to the receiving station; and in that transmission, all the CDMA signals are added together. Then, in the receiving station, the data from any one particular transmitting station is recovered by multiplying the composite CDMA signal by the same spreading codes which that one particular transmitting station used.

One prior art CDMA communication system is described in U.S. Pat. No. 4,908,836 by Rushforth et al entitled "Method And Apparatus For Decoding Multiple Bit Sequences That Are Transmitted Simultaneously In A Single Channel". Also, another CDMA communication system is described in U.S. Pat. No. 5,031,173 by Short et al entitled "Decoder For Added Asynchronous Bit Sequences". Both of these Patents are assigned to the assignee of the present invention.

In prior art CDMA communication systems such as those cited above, the spreading codes which the transmitting stations send in their CDMA signals occur asynchronously to each other. Consequently, those codes interfere with each other by an increased amount as the number of transmitting stations increases. This in turn limits the maximum number of transmitting stations that can simultaneously send their data with an acceptable error rate to the receiving station.

Accordingly, a primary object of the present invention is to provide an improved multipoint-to-point CDMA communication system in which the interference between the spreading codes is reduced so a greater number of transmitting stations can simultaneously send data.

BRIEF SUMMARY OF THE INVENTION

In accordance with the present invention, a multipoint-to-point CDMA communication system comprises a plurality of CDMA transmitting stations and a single CDMA receiving station, all of which are intercoupled to each other over one CDMA channel and one feedback channel.

Included in each CDMA transmitting station is a modulator which modulates that stations data with a respective spreading code to generate CDMA signals. Those CDMA signals from all of the transmitting stations are added together on the one CDMA channel which carries them to the CDMA receiving station. Included in the CDMA receiving station is an error detection circuit that measures respective time differences between a reference clock signal and the respective spreading codes in the composite CDMA signal that is received. Also, the CDMA receiving station includes an error sending circuit which sends respective error signals, that indicate the measured time differences, on the feedback channel to each of the CDMA transmitting stations.

Each of the CDMA transmitting stations includes an error receiver circuit which receives a respective error signal on the feedback channel; and it includes an error correction circuit which responds to the received error signal by time shifting the CDMA signals which it sends to the CDMA channel such that the spreading code in that signal arrives at the receiving station in synchronization with the reference clock signal.

By using codes which have minimal cross-correlation when the time offset between them is zero, the interference between the CDMA signals at the receive station is reduced. Consequently, the number of stations that can transmit simultaneously is increased.

BRIEF DESCRIPTION OF THE DRAWINGS

Various preferred embodiments of the invention are described herein in conjunction with the accompanying drawings wherein:

FIG. 5 lists a set of steps which constitute a preferred process by which the CDMA transmitting stations and CDMA receiving station in the FIG. 1 system interact;

DETAILED DESCRIPTION

Figure 1:
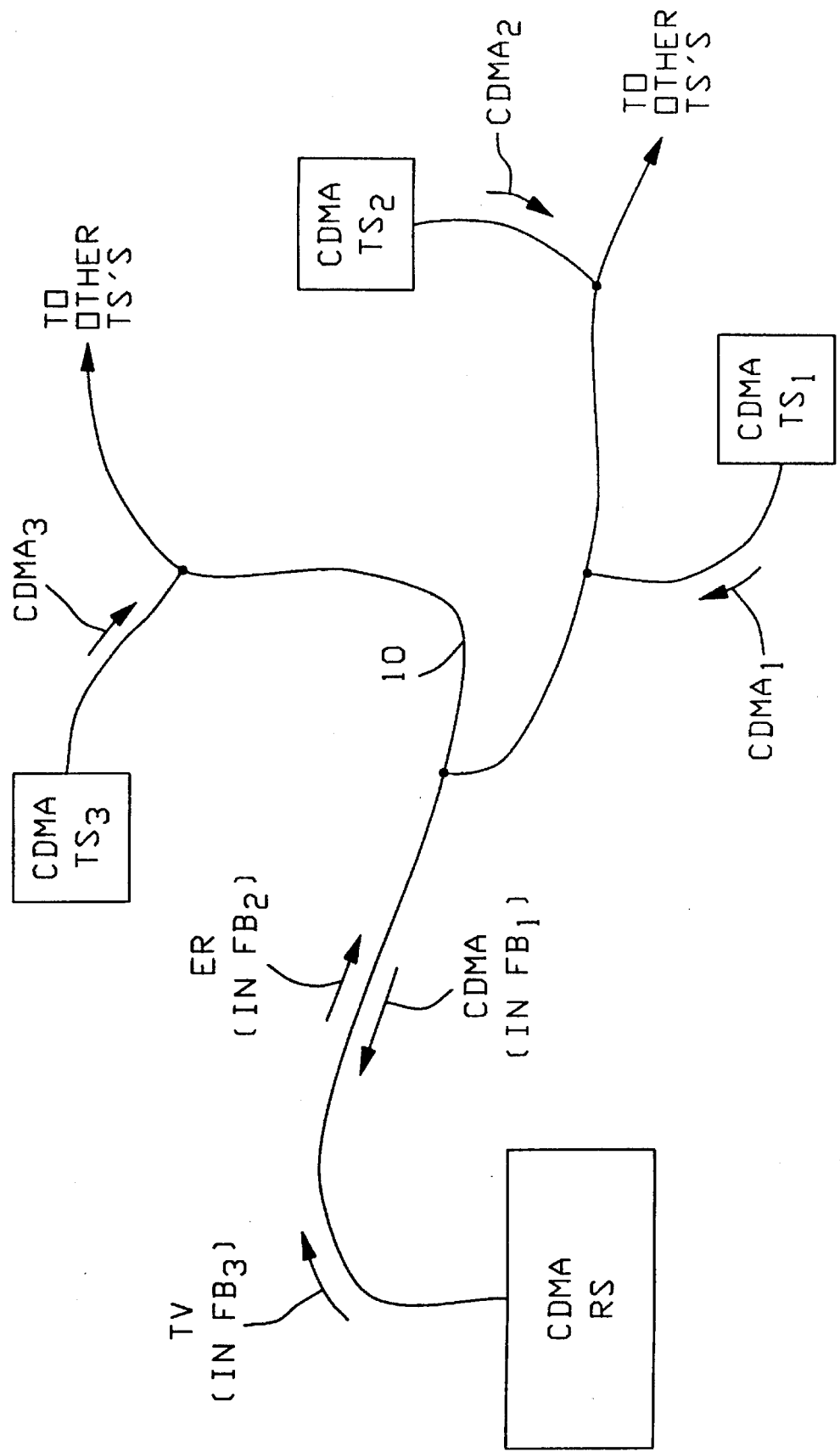
FIG. 1 shows an overview of a multipoint-to-point CDMA communication system which is structured as one preferred embodiment of the present invention.

Referring now to FIG. 1, a preferred embodiment of the present invention will be described. This FIG. 1 embodiment is a synchronous multipoint-to-point CDMA communication system which includes a single CDMA receiving station RS and a plurality of CDMA transmitting stations $TS_1$, $TS_2$, $TS_3$, ... etc. All of the CDMA transmitting stations and the single CDMA receiving station are intercoupled to each other by a single optical fiber 10 as shown.

In operation, each of the CDMA transmitting stations modulates any data which it has to send with a respective spreading code to thereby generate its own CDMA signals. Transmitting station $TS_1$ modulates its data with code $PN_1$ to generate signals $CDMA_2$; transmitting station $TS_2$ modulates its data with code $PN_2$ to generate signals $CDMA_2$; etc. Those signals $CDMA_1$, $CDMA_2$, etc. are sent on the optical fiber 10 simultaneously; and there they are added together to form a composite signal CDMA. Each of the signals $CDMA_1$, $CDMA_2$, etc. fully occupy one and the same frequency band FB1.

Within the CDMA receiving station RS is an error detection circuit which detects respective time differences between a reference clock signal and the spreading codes $PN_1$, $PN_2$, etc. in the composite signal CDMA. Also in the receiving station is an error sending circuit which sends respective error signals $ER_1$, $ER_2$, etc. to each of the CMDA transmitting stations $TS_1$, $TS_2$, etc. that indicate the detected time differences. These error signals $ER_1$, $ER_2$, etc. are time multiplexed on the optical fiber 10 in a frequency band FB2 which does not overlap the frequency band FB1.

Each CDMA transmitting station $TS_x$ receives its respective error signal $ER_x$ on the optical fiber 10; and in response it shifts in time the $CDMA_x$ signals which it transmits such that the spreading code $PN_x$ in the transmitted $CDMA_x$ signals arrive at the receiving station in synchronization with the reference clock signals. Consequently, at receiving station RS, all of the spreading codes in the composite signal CDMA are in synchronization with each other.

By using spreading codes which have minimal cross-correlation when the time offset between them is essentially zero, the amount of interference between the PN codes as received at the receive station RS is substantially reduced, in comparison to the interference which would occur if the codes were received asynchronously. As a result, the maximum number of transmitting stations which can simultaneously send data on to the optical fiber 10, without causing an unacceptable error rate in the receiver station RS, is increased.

Figure 2:
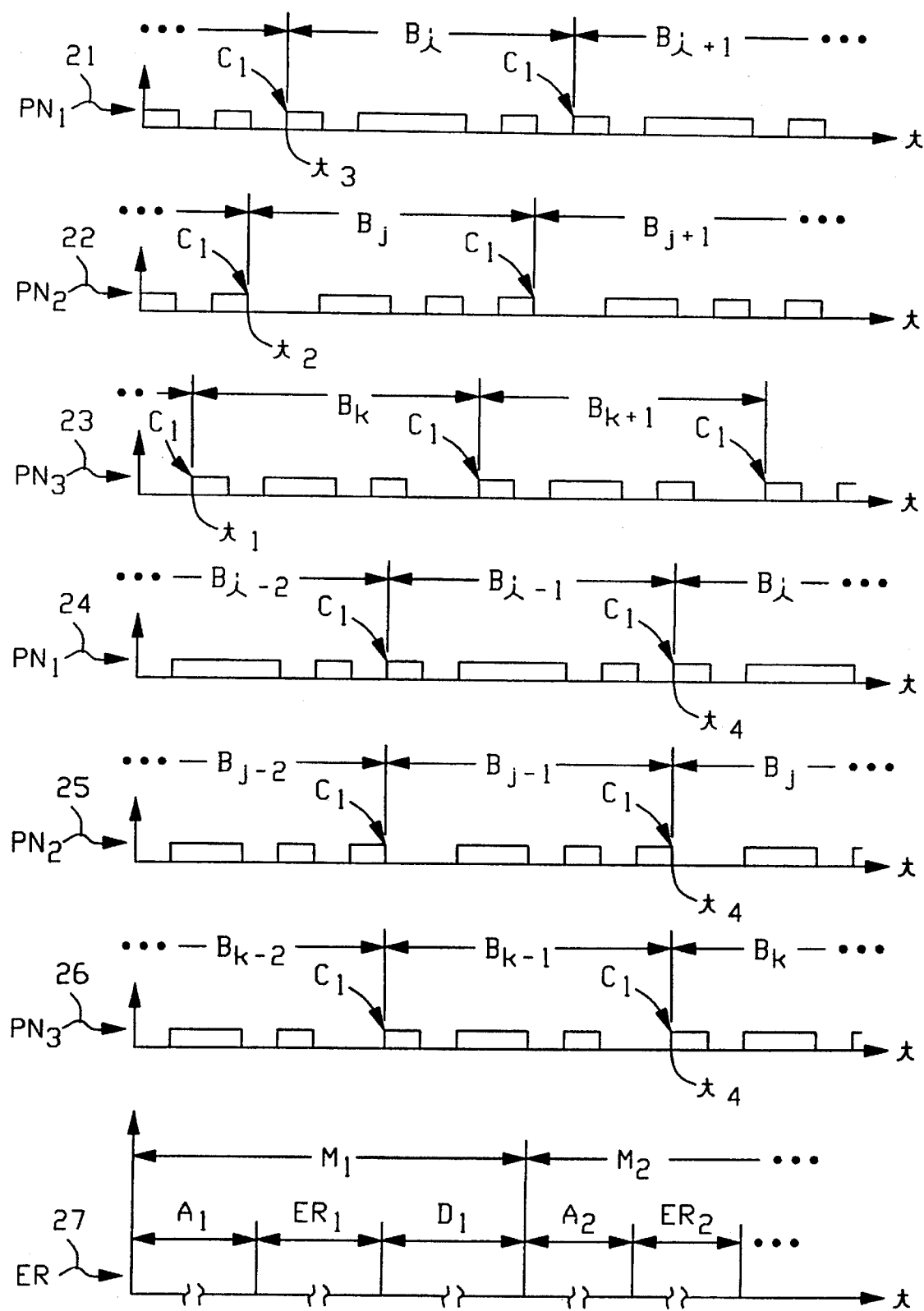
FIG. 2 shows a set of voltage waveforms which occur at various points in the communication system of FIG. 1 and which illustrate its operation.

An example of some of the above described signals which occur in the FIG. 1 communication system is illustrated in FIG. 2. There, a set of voltage waveforms 21, 22, and 23 respectively show the spreading codes $PN_1$, $PN_2$, and $PN_3$ as they occur in time within the $CDMA_x$ signals at the transmitting stations $TS_1$, $TS_2$, and $TS_3$. By comparison, another set of voltage waveforms 24, 25, and 26 respectively show the same spreading codes $PN_1$, $PN_2$, and $PN_3$ as they occur in time within the composite CDMA signal at the receiving station RS.

In each of the above voltage waveforms, the symbol $C_1$ indicates the start of the first chip in the spreading code. Also in those voltage waveforms, the symbols $B_i$, $B_j$, and $B_k$ respectively indicate the ith, jth, and kth bit of data by which the spreading code is multiplied to generate a CDMA signal. For each bit of data that is sent, the corresponding spreading code by which that bit is multiplied starts over with the first chip $C_1$.

Inspection of waveform 23 shows that at time instant t1, the transmitting station $TS_3$ is starting to send data bit $B_k$ by multiplying that data bit with the first chip of its spreading code $PN_3$. Likewise, waveform 22 shows that at time instant t2, the transmitting station $TS_2$ is starting to transmit data bit $B_j$ by multiplying that data bit with the first chip of its spreading code $PN_2$; and waveform 21 shows that at time instant t3, the transmitting station $TS_1$ is starting to transmit data bit $B_i$ by multiplying that data bit with the first chip of its spreading code $PN_1$.

All of those signals $C_1PN_3B_k$ and $C_1PN_2B_j$ and $C_1PN_1B_i$ simultaneously travel down the optical fiber 10 to the receiving station RS; and at that receiving station, the spreading codes are in synchronization with each other. This is shown at time instant t4 in the voltage waveforms 24, 25, and 26. Due to this synchronization, the degree to which the spreading codes interfere with each other at the receiving station RS is reduced.

How the above spreading codes get synchronized is illustrated in FIG. 2 by a voltage waveform 27 which consists of a series of time interleaved messages $M_1$, $M_2$, etc. Each message $M_i$ includes an address $A_i$, an error signal $ER_i$, and data $D_i$. Here, the address $A_i$ selects a particular one of the transmitting stations $TS_1$, $TS_2$, $TS_3$, etc.; the error signal $ER_i$ tells the addressed transmitting station the amount by which its transmitted CDMA signal must be shifted in time in order to arrive at the receiving station in synchronization with the reference clock; and the data signal $D_i$ provides any additional information which the CDMA receiving station RS has to send to the addressed transmitting station.

This communication system of FIG. 1 has a variety of applications. One such application, for example, is as an interactive cable television network. There, the "data" which each of the CDMA transmitting stations $TS_1$, $TS_2$, etc. send in their CDMA signals includes a "request" for a particular television program or movie. Those requests travel down the optical fiber 10 where they are received by the single CDMA receiving station RS; and in response, the receiving station sends the requested television program or movie back to the requester on the optical fiber 10. These television/movie signals are sent in a frequency band FB3 which does not overlap either of the frequency bands FB1 and FB2.

Another application for the FIG. 1 communication system is as a telephone network. In that application, each of the CDMA transmitting stations $TS_1$, $TS_2$, etc. include a telephone which converts dialed numbers and voice to electrical signals; and those electrical signals then become the "data" which is modulated by a spreading code and sent to the optical fiber 10 as one of the signals $CDMA_x$. Each $CDMA_x$ signal then travels down the optical fiber 10 to the CDMA receive station where it is decoded and forwarded to a conventional telephone switching center. Return voice signals from the called telephone are sent from the CDMA receive station RS to a CDMA transmitting station $TS_x$ on the optical fiber 10 in a frequency band FB3 which is separate from the frequency FB1 and FB2.

Figure 3:
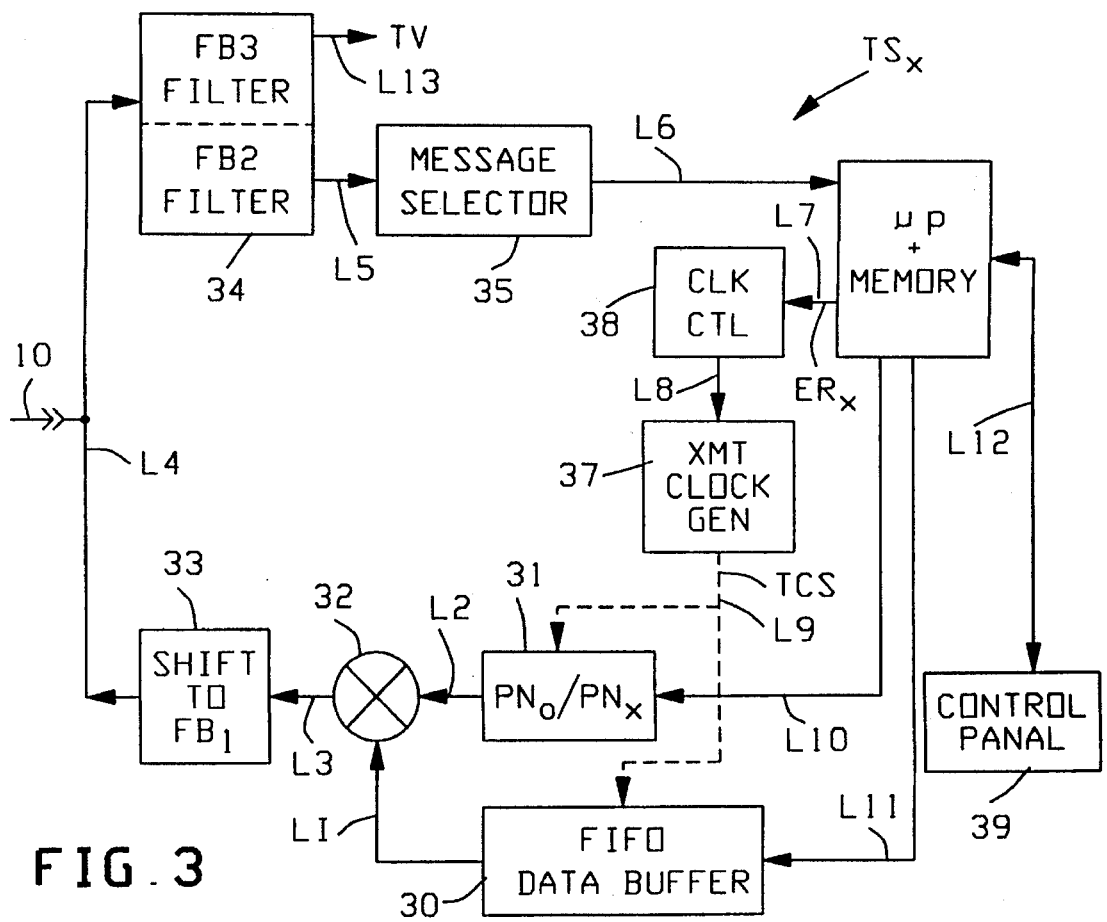
FIG. 3 is a detailed circuit diagram of one preferred internal structure for anyone of the transmitting stations in the FIG. 1 system.

Now, with reference to FIG. 3, a preferred internal structure for each of the transmitting stations $TS_x$ in FIG. 1 system will be described. This FIG. 3 embodiment includes ten electronic modules 30–39. All of the modules 30–39 are interconnected to each other by a set of signal lines L1–L13 as shown in FIG. 3, and they are described below in Table 1.

TABLE 1

| MODULE | DESCRIPTION |
|---|---|
| 30 | A first-in-first-out data buffer (FIFO) which receives data on signal line L11 and sends data on signal line L1. |
| 31 | A spreading code generator which generates codes $PN_o$ and $PN_x$ on signal line L2. |

TABLE 1-continued

| MODULE | DESCRIPTION |
|---|---|
| 32 | A modulator which multiplies data from the FIFO 30 with a code from the spreading code generator 31 and sends the product on signal line L3. |
| 33 | A circuit which generates on signal line L4 a frequency shifted replica of the output signal from the modulator 32 such that the replicated signal is in the CDMA frequency band FB1. |
| 34 | A pair of filters, one of which passes the messages in the frequency band FB2 from the optical fiber 10 to signal line L5, and another which passes the television/telephone signals in the frequency band FB3 to signal line L13. |
| 35 | A circuit which examines each address $A_i$ in the messages M, and passes only those messages which have an address that is assigned to a particular transmitting station $TS_x$. |
| 36 | A microprocessor, such as an Intel 80/386 chip and an associated instruction memory. |
| 37 | A clock generator which generates transmit clock signals TCS on signal line L9. These TCS signals determine the time instant at which data in the FIFO 30 starts to get modulated with the spreading code from the PN generator 31 and determine the modulation frequency. |
| 38 | A clock control circuit which receives the error signals $ER_x$ in the messages which are passed to the microprocessor 35; and in response, sends control signals to the transmit clock generator 37 on signal line L8. These control signals direct the clock generator to increase or decrease the modulation frequency such that error signals $ER_x$ are reduced. |
| 39 | A control panel by which data is manually entered and sent to the microprocessor 36 for transmission, and by which data can be received in a message M and visually displayed. |

Figure 4:
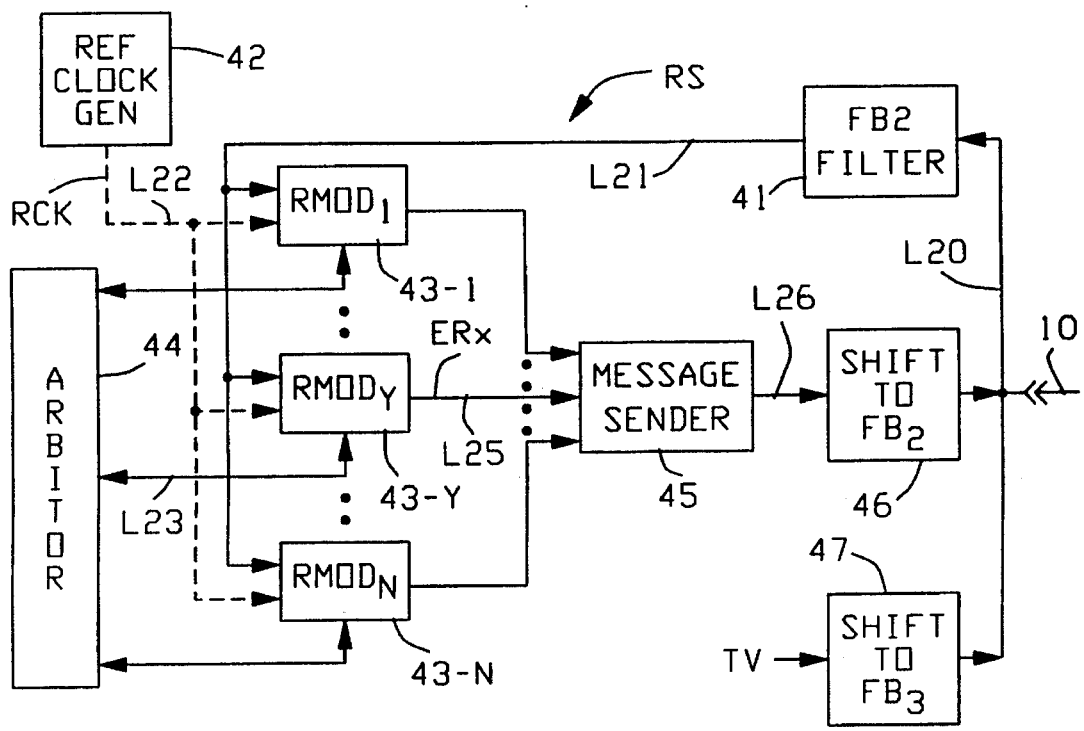
FIG. 4 is a detailed circuit diagram of one preferred internal structure for the single receiving station in the FIG. 1 system.

All of the modules 30–39 in the FIG. 3 transmitting station $TS_x$ interact with each other to send the CDMA signals to a receiving station RS by a process which will be described shortly in conjunction with FIG. 5. Firstly, however, a preferred embodiment of the receiving station RS will be described in conjunction with FIG. 4. This FIG. 4 embodiment of the receiving station RS includes several electronic modules 41–47. All of those modules are interconnected to each other by a set of signal lines L20–L27, and they are described below in Table 2.

TABLE 2

| MODULE | DESCRIPTION |
|---|---|
| 41 | A filter which receives all of the signals from the optical fiber 10 and which passes to signal line L21, just the CDMA signals in frequency band FB1. |
| 42 | A reference clock generator which generates on signal line L22, a reference clock signal RCK. All of the spreading codes that are contained within the composite CDMA signal are to be synchronized to this clock RCK. |
| 43-1 thru 43-N | Each of these is a CDMA receiver module which locks onto any one of the spreading codes $PN_i$ in the composite CDMA signal on line L21. After locking, a receiver module generates the error signal $ER_i$ on line L25 which indicates the time difference that |

TABLE 2-continued

Figures 6, 7:
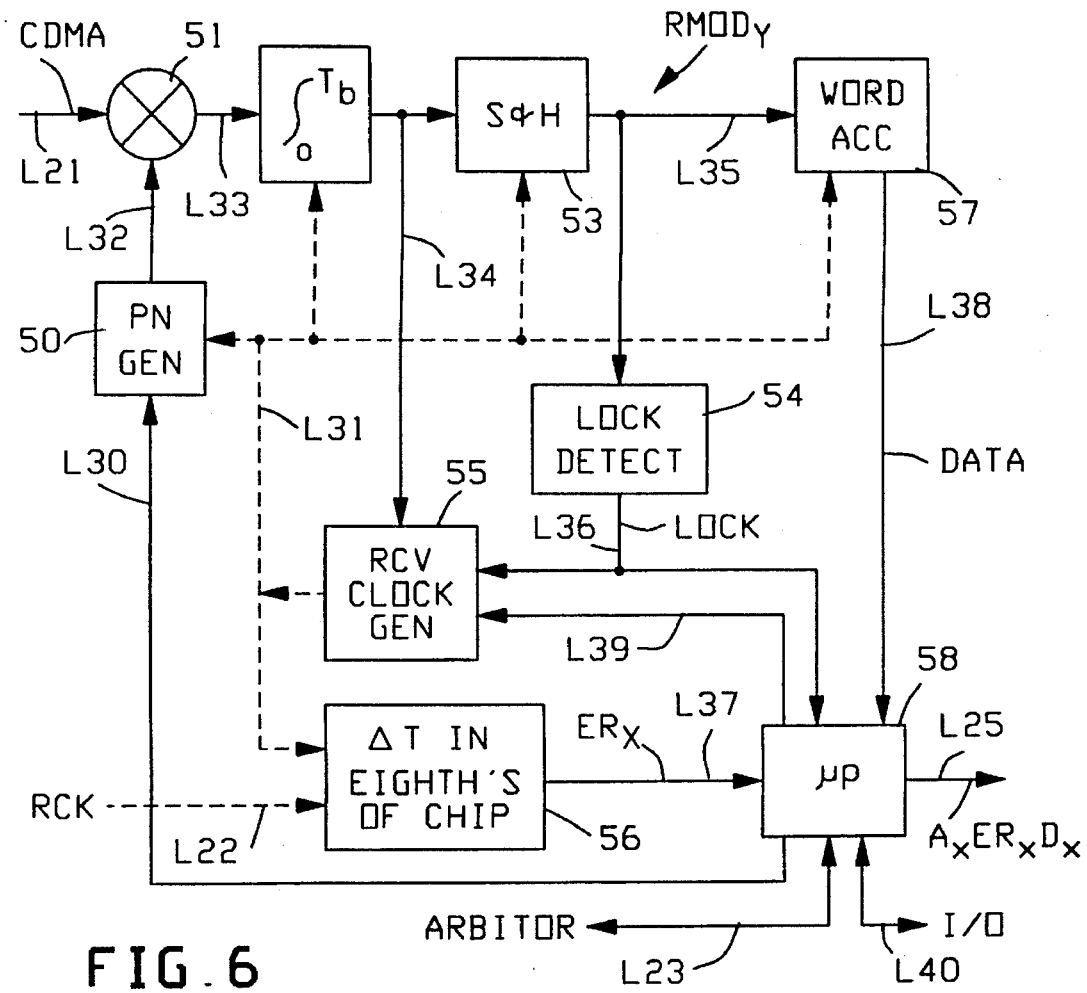
FIG. 6 is a detailed circuit diagram of one preferred internal structure for anyone of the receive modules in the FIG. 4 receive station; and, FIG. 7 is a set of equations which shows the degree to which the system of FIG. 1 enables the number of transmitting stations to be increased over an asynchrous system.

| MODULE | DESCRIPTION |
|---|---|
|  | occurs between the received $PN_i$ code and the reference clock signal RCK. Also each receiver module reads the data in the CDMA signal that has been modulated by the $PN_i$ code to which it is locked. One preferred internal structure for each of these read modules is shown in FIG. 6. |
| 44 | An arbiter circuit which receives requests on line L23 from each of the receive modules to stay locked on to a spreading code from a particular transmit station, and which either accepts or rejects that request. |
| 45 | A circuit which receives the error signals $ER_x$ on line L25 from each of the receive modules, and which sends these errors to line L26 in a time shared fashion such that they do not overlap. |
| 46 | A circuit which receives a sequence of error messages from circuit 45 and replicates them on optical fiber 10 in the frequency band FB2. |
| 47 | A circuit which receives television/telephone signals from an external source and passes those signals to the optical fiber 10 in frequency band FB3. |

Now, with reference to FIG. 5, a preferred process by which all of the modules 30–39 in each of the transmitting stations $TS_1$, $TS_2$, $TS_3$, etc. interact with all of the modules 41–47 in the receiving station will be described. This process, as shown in FIG. 5, is comprised of a series of steps that are labeled S1 thru S18.

Initially, when any one of the transmitting stations $TS_x$ begins to transmit its signals $CDMA_x$ on the optical fiber 10, that transmitting station selects a predetermined spreading code $PN_o$ which is the same for all the transmitting stations. Then, station $TS_x$ uses the spreading code $PN_o$ to modulate its address $A_x$ which is different for each transmitting station. This step, in FIG. 5, is step S1.

In performing the above step S1, the FIG. 3 embodiment of the transmitting station $TS_x$ operates as follows. Initially, the control panel 39 is used by an operator to send a signal on line L12 which indicates that the operator has data to send to the receiving station RS. In response, the microprocessor sends the address $A_x$ of the transmit station $TS_x$ to the data buffer 30, and it sends the spreading code $PN_0$ to the PN generator 31.

At this time, the clock generator 37 is generating transmit clock signals TCS which are completely unsynchronized to the reference clock RCK in the receiving stations. These TCS clock signals control the timing with which the address $A_x$ in the data buffer 30 is modulated by the spreading code $PN_0$ and sent to the optical fiber 10 as signal $CDMA_x$.

In the receive station RS, each receive module which is not presently locked onto any spreading code will continuously attempt to lock onto the spreading code $PN_0$ in the received composite signal CDMA. This occurs as step S2 in FIG. 5. In each of the receive modules, the attempt to lock onto the received spreading code $PN_0$ is achieved by internally generating the code $PN_0$ with a time varying phase until that phase matches the phase of the received $PN_0$ code.

After a particular receive module $RMOD_y$ locks onto the received spreading code $PN_0$, it performs steps S3 through S7 in the FIG. 5 process. In step S3, the receive module $RMOD_y$ reads the address $A_x$ which was encoded by the transmitting station $TS_x$ into its transmitted signal $CDMA_x$. Then, in step S4, the receive module $RMOD_y$ sends the address $A_x$ to the arbiter 44. If the arbiter 44 has not previously received the same address $A_x$ from any of the other receive modules, then the arbiter directs the receive module $RMOD_y$ to stay locked onto the received $PN_0$ spreading code from the transmit station with address $A_x$, and proceed with the remainder of the process. This is step S5 in FIG. 5.

After the receive module $RMOD_y$ is told by the arbiter to proceed, it then performs step S6 wherein it measures the time difference between the received spreading code $PN_0$ and the reference clock RCK from clock generator 42. Then, in step S7, the receive module $RMOD_y$ sends to the message sending module 45, an error signal $ER_x$ which indicates the measured time difference, and it sends the address $A_x$ of station $TS_x$. In response, module 45 sends the error $ER_x$ and the address $A_x$ as one of the time multiplexed messages M on the optical fiber 10 in frequency band $FB_2$.

That message M which is sent in step S7, then travels to station $TS_x$ whereupon it is received. This occurs in FIG. 5 as step S8. Then, in step S9, station $TS_x$ uses the received error signals $ER_x$ to shift in time the signals $CDMA_x$ which it generates such that the size of the error $ER_x$ in the receiving station is reduced.

In the FIG. 3 embodiment of the transmitting station $TS_x$, the above steps S8 and S9 are performed by the modules 34–37. There, module 34 and 35 receive the error information $ER_x$ from the optical fiber 10 and send it to the microprocessor 36. If the error signal $ER_x$ indicates a large time difference (e.g.—more then two chips), then the microprocessor 36 signals the spreading code generator 31 over line L10 to shift the code on line L2 by an integer number of chips such that the error is decreased.

When the error signals $ER_x$ are small, the microprocessor 36 transfers the error signals $ER_x$ to the clock control module 38. Then, if the error signals $ER_x$ indicate that the signals $CDMA_x$ are arriving at the receive station too late, the module 38 directs the transmit clock generator 37 to generate the TCS clock signals with a shorter time period so that the error is decreased. Conversely, if the error signals $ER_x$ indicate that the signals $CDMA_x$ are arriving at the receive station too early, then module 38 directs the transmit clock generator 37 to generate the TCS clock signals with a longer time period so that the error is decreased.

When the time shifted $CDMA_x$ signals reach the receive station RS, the receive module $RMOD_y$ will maintain its lock on that signal by time shifting its own internal internally generating spreading code $PN_0$. This occurs as step S10 in FIG. 5. Then, after that time shift is complete, the receive module $RMOD_y$ remeasures the time difference between the reference clock RCK and the received signal $CDMA_x$. This is indicated as step S11.

If the remeasured time error $ER_x$ is still more than a certain maximum limit which is close to zero, then the above described process is repeated beginning with step S7. This is indicated by step S12 in FIG. 5. Such a limit can, for example, be one-quarter of a chip time period or less.

Conversely, if the remeasured time error $ER_x$ is within the maximum limit, then the receive module $RMOD_y$ requests and obtains from the arbiter 44 on signal line L23, a particular spreading code $PN_x$ which is not presently being used by any of the transmitting stations. Then, that spreading code $PN_x$ is sent to the message sending module 45 along with the address $A_x$ of the CDMA transmitting station $TS_x$. In response, module 45 sends the spreading code $PN_x$ as the data portion $D_x$ of a time multiplexed message M on frequency band $FB_2$. All of this occurs in step S13.

That spreading code $PN_x$ which is transmitted by step S13 travels along the optical fiber 10 to the transmitting station $TS_x$ where it is received. In FIG. 5, this receipt of the code $PN_x$ by station $TS_x$ occurs in step S14. Thereafter, in step S15, the microprocessor 36 in the transmitting station $TS_x$ obtains the new spreading code $PN_x$ from the message selector 35, and it transfers that code to the spreading code generator 31.

In response, the spreading code generator 31 changes the code signals which it sends to the modulator 32 from code $PN_o$ to code $PN_x$. This change occurs while the clock signals TCS from the clock generator 37 maintain their current phase and frequency. Thus, the new spreading code $PN_x$ is generated with the same timing relationship to the reference clock RCK in the receive station RS as the preceding code $PN_0$. This occurs in FIG. 5 as step S15.

Likewise, in the receive station, module $RMOD_y$ starts receiving the signals $CDMA_x$, which now contains the new spreading code $PN_x$, by internally generating that code $PN_x$ in phase with the reference clock RCK. This occurs as step S16. Thereafter, the receive module $RMOD_y$ keeps the received spreading code $PN_x$ in synchronization with the reference clock RCK by measuring any time difference which starts to occur between the received $PN_x$ code and the reference clock and by sending that timing error to station $TS_x$ via the error signals $ER_x$ in the frequency band $FB_2$. This occurs in steps S17 and S18.

Transmit station $TS_x$ continues to use these the spreading code $PN_x$ to modulate the data which it has to transmit until all of its transmissions are complete; and likewise, the receive module $RMOD_y$ continues to use the spreading code $PN_x$ to receive those transmissions. Then, when all of the data is transmitted, the transmit station $TS_x$ sends no more signals on the optical fiber 10; and the receive module $RMOD_y$ returns to step 82 of the FIG. 5 process. In step S2, module $RMOD_y$ attempts to make a new connection with another one of the transmitting stations by internally generating the predetermined spreading code $PN_0$ and sweeping its start time until by chance it happens to match the start time of a $PN_0$ code in the composite CDMA signal.

Next, with reference to FIG. 6, one preferred internal structure for anyone of the receive modules $RMOD_y$ will be described. This FIG. 6 embodiment includes several circuit modules 50 thru 59; and they are interconnected as shown in FIG. 6. by a set of signal lines L30 thru L40. Each of the circuit modules 50–59 is described below in Table 3.

TABLE 3

| MODULE | DESCRIPTION |
|---|---|
| 50 | A spreading code generator which selectively generates on the signal line L32, any one of the spreading codes $PN_o$ or $PN_x$. That particular spreading code which is to be generated is received by module 50 on the signal line L30; and the frequency of that code as well as the starting time instant of the first chip $C_1$ is controlled by timing signals from a receive clock generator on signal lines L31. |
| 51 | A demodulator which multiplies the composite CDMA signal on signal line L21 by the spreading code from the spreading code generator 50 to thereby produce a demodulated/despread signal on signal line L33. |
| 52 | An integrator which integrates the demodulated signal on signal line L33 during each bit time interval $T_b$ whose beginning is |

TABLE 3-continued

| MODULE | DESCRIPTION |
|---|---|
| | specified by the timing signals from the receive clock generator on signal line L31. |
| 53 | A sample and hold circuit which samples the output signals from the integrator 52 on signal line L34 and which holds each sample for one bit time period $T_b$ on the signal line L35. This sample and hold operation occurs in synchronization with receive clock signals on the signal line L31. |
| 54 | A lock detector circuit which monitors the output signals from the sample and hold circuit on signal line L35, and compares them to a threshold level. If that threshold is exceeded for a certain number of consecutive bits, then this circuit generates a LOCK signal on the signal line L36. A true LOCK signal indicates that the spreading code on line L32 is in synchronization with the spreading code signal in the composite CDMA signal on line L21. |
| 55 | A receive clock generator which monitors the LOCK signal on signal line L36; and in response, generates the receive clock timing signals on the signal lines L30. If the LOCK signal is false, the receive clock generator 55 directs the PN generator 50 to sweep the start time at which the first chip $C_1$ in the spreading code is generated. Conversely, if the LOCK signal is true, the receive clock generator 55 responds to the output signals from the integrator on line L34 by staying locked on to the spreading code in the received CDMA signal. |
| 56 | An error detection circuit which receives the timing signals from the receive clock generator on the signal lines L31, and which compares the start time of the first chip $C_1$ from module 50 to the reference clock signals RCK on line L22. If a time difference occurs between the signals, circuit 56 generates an error signal on the signal line L37 which indicates what that timing difference is. |
| 57 | An accumulator circuit which serially stores bits of data as they are output on the signal line L35 from the sample and hold circuit 53; and which sends out the stored bits in parallel as words on line L38. One word can be any predetermined number of bits. |
| 58 | A microprocessor, such as an Intel 80/386 chip and an associated instruction memory. This microprocessor receives the LOCK signal on line L36, the error signals ER. on line L37, the DATA signals on line L38, and the arbiter signals on line L23. In response, this microprocessor causes several of the previously described steps S2–S7, S12–S13, and S16–S18 of FIG. 5 to be carried out. |

In the FIG. 6 circuit, modules 50, 51, 52, 53, 54, and 55 operate together in a loop. Within this loop, the PN generator 50 sweeps the start time of the spreading code $PN_0$ until the first chip $C_1$ from the generator 50 aligns itself with the first chip $C_1$ of code $PN_0$ in the composite CDMA signal on line L21. Note that several of the CDMA transmit stations may be sending the code $PN_0$ simultaneously in an asynchronous manner.

Once the above alignment occurs, the lock detector 54 generates the LOCK signal which in turn is sensed by the microprocessor 58. Then the microprocessor 58 reads the identification $ID_x$ of the transmit station as DATA on line L38, and it sends that identification to the arbiter on line L23.

If the arbiter tells the microprocessor 58 to not proceed, then the microprocessor 58 sends a signal on line L39 to the clock generator which causes it to again start sweeping the $PN_0$ code from generator 50. Otherwise, the microprocessor 58 reads the timing error signal $ER_x$ on line L37; and it sends on line L25, the error signal $ER_x$ along with the transmit station identification $ID_x$. By repeatedly reading the timing error signal $ER_x$ and sending it to the transmitting station, the transmitting station is able to time-shift its $CDMA_x$ signal such that the timing error is reduced to essentially zero.

After the above error reduction occurs, the microprocessor 58 sends a respective spreading code $PN_x$ to the transmit station $TS_x$. When the code $PN_x$ is received in the transmit station $TS_x$, that station sends a predetermined control word back to the FIG. 6 circuit. Then, one word after the control word is sent, the transmit station $TS_x$ starts to modulate its data with the $PN_x$ code.

Meanwhile, the microprocessor 58 in the FIG. 6 circuit monitors line L38 to detect when the control word arrives in the word accumulator 57. Then, when the control word is detected, the microprocessor 58 sends the $PN_x$ code to the spreading code generator 50. In response, beginning with the start of the next word, code $PN_x$ is sent by the generator 50 to the demodulator 51. Consequently, both inputs L21 and L22 switch to the $PN_x$ code at the same time.

Thereafter, all "data" which is received in the word accumulator 57 is read by the microprocessor 58 and output on line L40 for any purpose. Likewise, all "data" for the receive station $TS_x$ is received by the microprocessor 58 on line L40 and sent on line L25.

Referring now to FIG. 7, the degree to which the number of transmitting stations in the FIG. 1 system is increased by having the spreading codes from those stations arrive synchronously at the receiving station will be described. Beginning first with equation 1 of FIG. 7, it says that the number of stations $N_s$ in the FIG. 1 system which can simultaneously transmit CDMA signals without any interference between the spreading codes is equal to the ratio of $W \div R_b$, where W is the chip rate of the transmissions and $R_b$ is the bit rate. In other words, $N_s$ is equal to the number of chips per bit.

Suppose for example, that the chip rate W and the bit rate $R_b$ have values as given by equation 2. In that case, substitution of equation 2 into equation 1 yields equation 3 which says that in the synchronous FIG. 1 system, a total of 256 transmitting stations can simultaneously transmit CDMA signals to the receive station without any intercode interference.

Also in the FIG. 1 system, the number of transmitting stations $N_s$ can be increased even beyond the equation 1 ratio of $W \div R_b$ if some interference between the transmitted spreading codes is allowed to occur. For example, such interference would occur if the chip rate and the bit rate were as given by equation 2, but the total number of transmitting stations is increased to around 300 instead of 256 as given by equation 3. As a limit on how much interference between the spreading codes can occur, a certain minimum signal-to-noise ratio must be maintained in order to keep the error rate at the receiving station below an acceptable level.

By comparison, suppose that the FIG. 1 system is modified such that all of the transmitting stations generate their spreading asynchronously to each other. In that case, the total number of transmitting stations which simultaneously transmit CDMA signals is given by equation 4. There the terms W and $R_b$ are as defined above; and the term $E_b/N_o$ is the minimum signal-to-noise ratio that is required in order to allow the CDMA transmissions to be demodulated without exceeding a certain error rate. This need for a minimum signal-to-noise ratio arises because when the spreading codes are sent asynchronously, those codes interfere with each other and thereby add noise to the signal.

An example of some specific values for the terms of equation 4 are given by equation 5. There, the minimum signal-to-noise ratio is given a value of 10. Such a value is needed to achieve an error rate of no more than one error per $10^5$ data bits when conventional binary phase shift key modulation is performed by the modulator in each transmitting station. Substituting the values of equation 5 into equation 4 yields equation 6, which says that only 25 stations can simultaneously transmit their data.

One preferred embodiment of the invention has now been described in detail. In addition, however, many changes and modifications can be made to the details of this embodiment without departing from the nature and spirit of the invention.

For example, as one modification to the communication system of FIG. 1, the optical fiber 10 can be replaced with any type of CDMA channel and any type of feedback channel which intercouple all of the stations RS, $TS_1$, $TS_2$, $TS_3$, etc. together. Suitably, the CDMA channel and the one feedback channel can be comprised of separate frequency bands in a single wireless radio transmission medium. Alternatively, the CDMA channel and the feedback channel can be comprised of separate frequency bands in a single metal wire cable, such as a coaxial cable or a cable which consists of a twisted pair of wires.

In the embodiments where the CDMA channel and the feedback channel are contained within an optical fiber or a metal cable, all of the stations RS, $TS_1$, $TS_2$, $TS_3$, etc. must be stationery relative to each other. However, in the embodiment where the CDMA channel and feedback channel comprise separate frequency bands in a wireless radio transmission medium, then all of those stations RS, $TS_1$, $TS_2$, etc. can be mobile relative to each other.

Also, as another variation to the FIG. 1 system, the data which is transmitted in any one of the frequency bands FB1, FB2, and FB3 can be generated from any desired source. For example, that data can be manually generated from a control panel such as a computer keyboard; or it can be generated automatically by a computer program; or it can be read from any type of storage medium, such as a magnetic disk; or it can be digitized voice from a telephone; or it can be digitized video signals from a camera.

Further, if the amount of data which needs to be sent to all of the CDMA transmitting stations is sufficiently small, then that data can be sent entirely as the data portion of the messages M1, M2, etc. in the feedback channel which occupies the frequency band FB2. In that case, the separate frequency band FB3 can be eliminated.

As still another modification, the internal structure of the transmit stations $TS_x$ may be modified such that the circuitry which reduces the error signals in the frequency band FB2 is different than that which is shown in FIG. 3. For example, in order to shift in time the CDMA signals which are sent, a variable time delay circuit can be inserted into line L3 of the FIG. 3 embodiment between the modules 32 and 33. This variable time delay circuit will receive the control signals on line L8 from the clock control circuit 38; and in response to those control signals, the variable delay circuit will either increase or decrease the amount of time with which the CDMA signals from the modulator 32 pass through the delay circuit to module 33. With this modification, the transmit clock signals on the lines L9 to the data buffer 30 and the PN generator 31 will be generated with a constant frequency.

Also, as another variation, each of the CDMA transmit stations $TS_1$, $TS_2$, $TS_3$ etc. can eliminate their use of the single predetermined spreading code $PN_0$ in steps S1 and S8 of the FIG. 5 process; and instead, each transmit station will always modulate its data with a respective spreading code which is preassigned and different for each station. In that case, in the receive station RS, each of the receive modules $RMOD_l$ thru $RMOD_n$ will also always use a different spreading code which matches the spreading code for one of the transmit stations. For example, the receive module $RMOD_1$ and a transmit station $TS_1$ will always use one particular spreading code $PN_a$; the receive module $RMOD_2$ and the transmit station $TS_2$ will always use a different spreading code $PN_b$; etc.

However, the FIG. 5 process is preferred without the above modification in situations where the total number of CDMA transmit stations is large, but only a small percentage of those stations transmit CDMA signals at the same time. In that case, the FIG. 5 process is preferred because it can be performed by providing only a small number of CDMA receive modules 43-1, 43-2, etc. in the FIG. 4 receive station RS. For example, if the total number of transmit stations is 256 but only 10% of them on average transmit at the same time, then only 25 to 30 CDMA receive modules need be provided.

As still another modification to the FIG. 1 system, any one of a variety of pre-existing spreading codes can be employed. For example, one particular set of spreading codes which can be used are the Walsh-Haddamard codes which are described in the publication *Telecommunication Systems Engineering*, Lindsey, Simon, Prentice Hall Electrical Engineering Series, Englewood Cliffs, N.J., 1973, pp. 190. Preferably, every pair of spreading codes have a predetermined minimum cross correlation when a time difference of zero occurs between them.

Further, as yet another modification, the timing error which must not be exceeded in steps S12 and S13 in the FIG. 5 process is not limited to one-quarter of a chip's time period. That one-quarter chip limit can be increased or decreased, depending upon the amount of interference which can occur between the spreading codes as received at the CDMA receiving station before the error rate in the demodulated data gets too large. Preferably however, that upper limit does not exceed a time duration of one-half of a chip.

Accordingly, in view of the above modifications, it is to be understood that the invention is not limited to the details of any one preferred embodiment but is defined by the appended claims.

What is claimed is:

1. A synchronous CDMA transmitting station which is comprised of:

a modulator circuit that modulates data siqnals with a spreading code to thereby generate CDMA signals;

a transmitter circuit, coupled to said modulator circuit, for sending, a replica of said CDMA signals on a CDMA channel;

an error receiver circuit, for receiving an error signal from a feedback channel; and, an error correction circuit, coupled to said error receiver circuit, which time shifts said replica of said CDMA signals on said CDMA channel in response to said error signal.

2. A synchronous CDMA transmitting station according to claim 1 wherein said error correction circuit sends control signals to said modulator circuit which initiates the generation of said CDMA signals from said modulator circuit with a delay that varies in response to said error signals.

3. A synchronous CDMA transmitting station according to claim 1 wherein said error correction circuit passes said CDMA signals through said error correction circuit to said transmitter circuit with a delay that varies in response to said error signals.

4. A synchronous CDMA receiving station which is comprised of:

a receiver circuit for receiving a CDMA signal over a CDMA channel where said CDMA signal includes the sum of a plurality of data signals which are modulated with respective spreading codes;

an error detection circuit, coupled to said receiver circuit, which detects respective time differences between said spreading codes in said received CDMA signal and a single reference clock signal; and, an error sending circuit, coupled to said error detection circuit, which sends respective error signals on a feedback channel that indicate said time differences.

5. A synchronous CDMA receiving station according to claim 4 wherein said receiving station sends said error signals on said feedback channel in one frequency band and simultaneously sends television signals on said feedback channel in another frequency band.

6. A synchronous CDMA receiving station according to claim 4 wherein said receiving station sends said error signals on said feedback channel in one frequency band during spaced apart time intervals and sends television signals on said feedback channel during different time intervals in the same frequency band.

* * * * *